United States Patent
Reyes, III et al.

(10) Patent No.: US 10,329,875 B2
(45) Date of Patent: Jun. 25, 2019

(54) APPARATUS AND METHOD FOR MONITORING VALVE OPERATION

(71) Applicant: Cameron International Corporation, Houston, TX (US)

(72) Inventors: Salvador Reyes, III, Houston, TX (US); Mark Saunders, Houston, TX (US); Kody Carrillo, Cypress, TX (US); Andrew Jaffrey, Scotland (GB)

(73) Assignee: Cameron International Corporation, Houston, TX (US)

( * ) Notice: Subject to any disclaimer, the term of this patent is extended or adjusted under 35 U.S.C. 154(b) by 474 days.

(21) Appl. No.: 14/942,404

(22) Filed: Nov. 16, 2015

(65) Prior Publication Data

US 2017/0138151 A1 May 18, 2017

(51) Int. Cl.

| | |
|---|---|
| *E21B 34/02* | (2006.01) |
| *E21B 33/06* | (2006.01) |
| *G01M 3/24* | (2006.01) |
| *E21B 33/035* | (2006.01) |
| *E21B 34/04* | (2006.01) |
| *F16K 37/00* | (2006.01) |
| *F15B 19/00* | (2006.01) |

(52) U.S. Cl.
CPC .......... *E21B 34/02* (2013.01); *E21B 33/0355* (2013.01); *E21B 33/06* (2013.01); *E21B 34/04* (2013.01); *F16K 37/0041* (2013.01); *G01M 3/24* (2013.01); *F15B 19/005* (2013.01)

(58) Field of Classification Search
CPC .......... E21B 34/02; E21B 33/06; G01M 3/24
See application file for complete search history.

(56) References Cited

U.S. PATENT DOCUMENTS

| | | | | |
|---|---|---|---|---|
| 5,517,854 | A  * | 5/1996 | Plumb | E21B 49/008 73/152.59 |
| 8,125,850 | B2 * | 2/2012 | Guigne | F17D 5/06 367/119 |
| 9,726,643 | B2 * | 8/2017 | Comeaux | G01N 29/14 |
| 2003/0019297 | A1 | 1/2003 | Fiebelkom et al. | |
| 2010/0084588 | A1 * | 4/2010 | Curtiss, III | E21B 34/16 251/57 |

(Continued)

FOREIGN PATENT DOCUMENTS

WO    2007041111 A2    4/2007

OTHER PUBLICATIONS

International Search Report dated Feb. 23, 2017, for International Application No. PCT/US2016/061830.

(Continued)

*Primary Examiner* — Matthew R Buck
*Assistant Examiner* — Aaron L Lembo
(74) *Attorney, Agent, or Firm* — Helene Raybaud

(57) ABSTRACT

An apparatus and method for monitoring valve operation. In one embodiment, an apparatus for monitoring valve operation includes a first acoustic sensor and a monitoring system. The first acoustic sensor is to couple to a valve to detect vibration of the valve. The monitoring system is communicatively coupled to the first acoustic sensor. The monitoring system is configured to receive a signal generated by the first acoustic sensor. The signal is representative of vibration of the valve. The monitoring system is also configured to identify leakage in the valve based on the signal.

22 Claims, 7 Drawing Sheets

(56) References Cited

U.S. PATENT DOCUMENTS

| | | |
|---|---|---|
| 2010/0268489 A1 | 10/2010 | Lie et al. |
| 2014/0027125 A1* | 1/2014 | McHugh .............. E21B 33/037 166/351 |
| 2014/0182381 A1* | 7/2014 | Comeaux .......... G05B 23/0245 73/587 |
| 2014/0260624 A1 | 9/2014 | Subrahmanyam et al. |
| 2015/0177403 A1 | 6/2015 | Haugen et al. |

OTHER PUBLICATIONS

International Preliminary Report on Patentability for the equivalent International patent application PCT/US2016/061830 dated May 22, 2018.

* cited by examiner

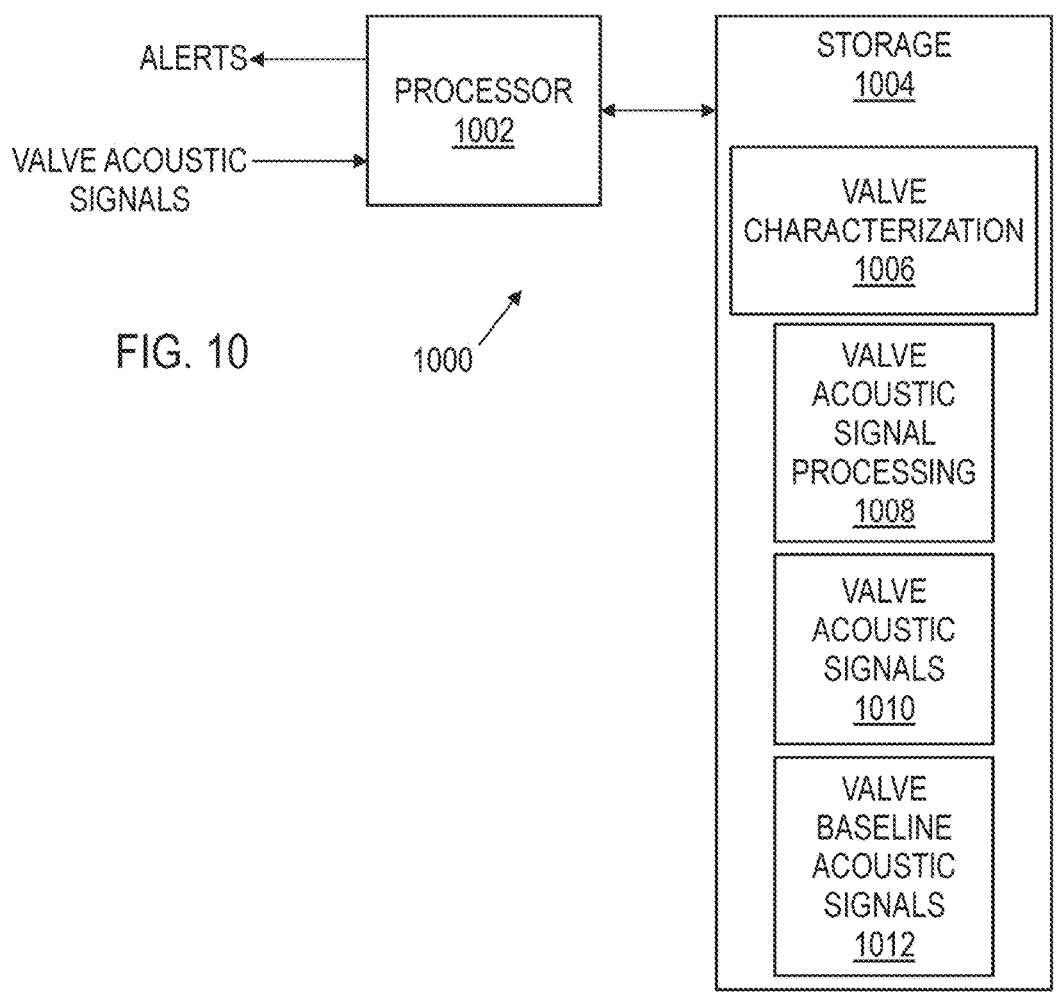

APPARATUS AND METHOD FOR MONITORING VALVE OPERATION

BACKGROUND

Blowout preventers (BOPs) are used in hydrocarbon drilling and production operations as a safety device that closes, isolates, and seals the wellbore. Blowout preventers are essentially large valves connected to the wellhead and comprise closure members that seal and close the well to prevent the release of high-pressure gas or liquids from the well. One type of blowout preventer used extensively in both low and high-pressure applications is a ram-type blowout preventer. A ram-type blowout preventer uses two opposed closure members, or rams, disposed within a specially designed housing, or body. The blowout preventer body has a bore aligned with the wellbore. Opposed cavities intersect the bore and support the rams as they move into and out of the bore. A bonnet is connected to the body on the outer end of each cavity and supports an operator system that provides the force required to move the rams into and out of the bore.

Ram-type blowout preventers are often operated using pressurized hydraulic fluid to control the position of the closure members relative to the bore. The flow of hydraulic fluid to the rams is controlled via one or more control pods of the blowout preventer control system. The control pod provides an electrical interface for operation of the blowout preventer from a drilling platform or other surface location. The control pod may be modularized to facilitate pod testing and service by allowing individual replacement and/or testing of each module. The control pod generally includes an electronics package (MUX module) and a hydraulics module (MOD module). The MUX module provides electrical communication with surface systems and electrically activated solenoid valves. The solenoid valves control flow of hydraulic fluid to hydraulic valves of the MOD module.

SUMMARY

An apparatus and method for monitoring valve operation are disclosed herein. In one embodiment, an apparatus for monitoring valve operation includes a first acoustic sensor and a monitoring system. The first acoustic sensor is to couple to a valve to detect vibration of the valve. The monitoring system is communicatively coupled to the first acoustic sensor. The monitoring system is configured to receive a signal generated by the first acoustic sensor. The signal is representative of vibration of the valve and the components therein. The monitoring system is also configured to identify leakage in the valve based on the signal.

In another embodiment, a well control system includes a blowout preventer, a hydraulics module, and a monitoring system. The hydraulics module includes a first valve and a first acoustic sensor. The first valve is configured to provide hydraulic pressure to the blow out preventer. The first acoustic sensor is coupled to the first valve to detect vibration of the first valve. The monitoring system is communicatively coupled to the first acoustic sensor. The monitoring system is configured to receive a first signal generated by the first acoustic sensor. The first signal is representative of vibration of the first valve. The monitoring system is also configured to identify a condition of the first valve based on the signal.

In a further embodiment, a fluid control assembly includes a first valve, a second valve, a first acoustic sensor, a second acoustic sensor, a third acoustic sensor, and a monitoring system. The first valve and the second valve are to control flow of fluid. The first acoustic sensor is coupled to the first valve to detect vibration of the first valve. The second acoustic sensor is coupled to the second valve to detect vibration of the second valve. The third acoustic sensor is to detect ambient vibration. The monitoring system is communicatively coupled to the first, second, and third acoustic sensors. The monitoring system is configured to receive signals generated by the first and second acoustic sensors that are representative of vibration of the first and second valves, and to receive signals generated by the third acoustic sensor that are representative of ambient vibration. The monitoring system is also configured to identify a condition of each of the first and second valves based on the signals.

BRIEF DESCRIPTION OF THE DRAWINGS

For a detailed description of exemplary embodiments of the invention, reference will now be made to the accompanying drawings in which:

FIG. 10 shows a block diagram of a valve monitor in accordance with various embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Like all mechanical components, the hydraulic valves used to actuate a blowout preventer (BOP) are subject to wear. Unfortunately, using conventional methods the condition of a valve may be difficult to determine until the valve exhibits symptoms clearly indicative of malfunction. Valve malfunction may result in the BOP, or a substantial portion thereof, being removed from service to facilitate valve replacement. Removing a BOP from service can be costly and time consuming.

Embodiments of the present disclosure include a monitoring system that characterizes valve operation. The monitoring system includes acoustic sensors coupled to the valves. The acoustic sensors acquire signals that are indicative of the state and condition of the valve. The monitoring system processes the signals to characterize the valve. Processing and analysis of the acoustic signals emitted by the valve allow the monitoring system to identify leaks in the valve that may undetectable using conventional methods and to identify degradation of valve components. As a result, embodiments can reduce the expense of BOP maintenance by allowing for replacement or repair of valves via routine maintenance operations rather than unscheduled removal of the BOP stack from service.

Figure 1:
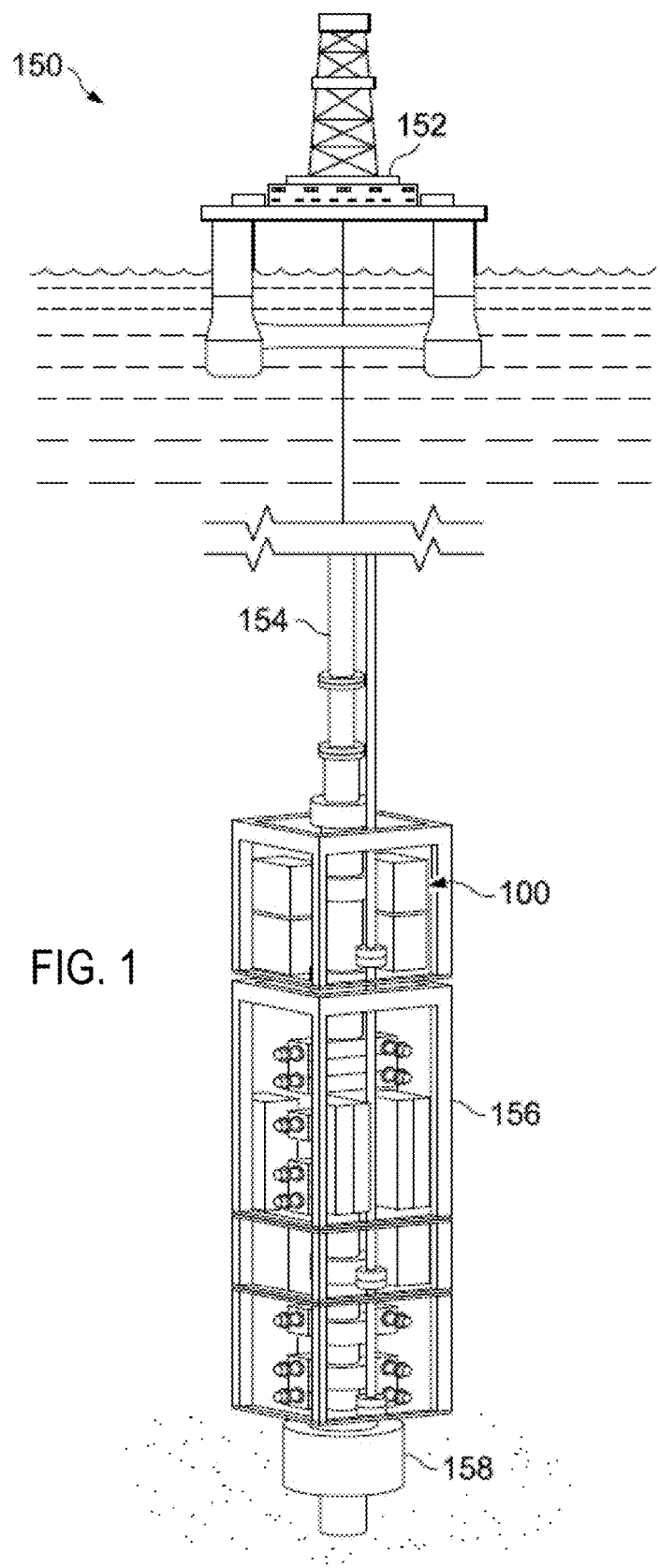
FIG. 1 shows a drilling system including a blowout preventer in accordance with various embodiments.

FIG. 1 shows a drilling system 150 in accordance with various embodiments. The drilling system 150 includes a drilling platform and drilling rig 152, a riser 154, and a BOP 156. The BOP 156 is coupled to a wellhead 158. The riser 154 connects the BOP 156 to the drilling platform 152. One or more control pods 100 are coupled to the BOP 156 for actuating BOP hydraulics in response to control signals provided from the surface. The control pods 100 include valves that control the flow of hydraulic fluid to the BOP 156. Failure of one of the valves can cause the BOP 156 to be removed from service for unscheduled replacement of the valve.

The drilling system 150 includes a valve monitoring system that characterizes the hydraulic valves of the BOP control pod 100 based on vibration generated by the valves. While FIG. 1 illustrates a marine drilling system 150, and embodiments of the present disclosure may be described with respect to the marine drilling system 150, embodiments are also applicable to monitoring valves in a land or surface drilling environment, and to various other applications in which monitoring of valve condition may be beneficial.

Figure 2:
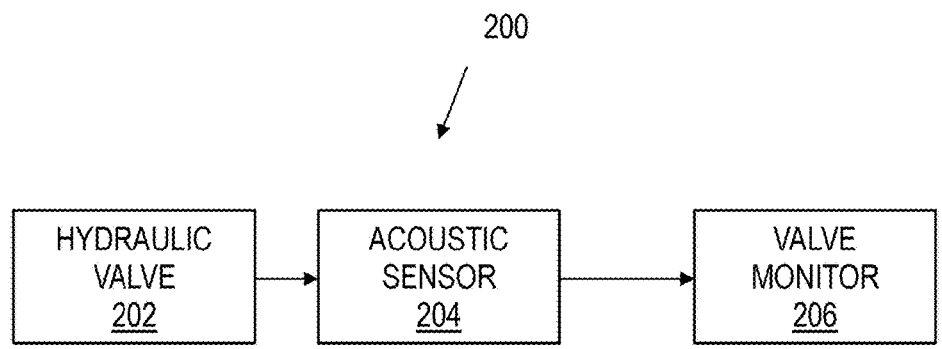
FIG. 2 shows a block diagram of a valve monitoring system in accordance with various embodiments.

FIG. 2 shows a block diagram of a valve monitoring system 200 suitable for use in the drilling system 150. The valve monitoring system 200 includes a valve 202, an acoustic sensor 204, and a valve monitor 206. The valve 202 is a valve of the BOP control pod 100. The valve 202 may be any type of valve suitable for controlling the flow of hydraulic fluid to the BOP 156. For example, the hydraulic valve 202 may be a ball valve, a needle valve, a gate valve, a butterfly valve, a shuttle valve, or any other type of valve suitable for controlling fluid flow.

The acoustic sensor 204 is coupled to the valve 202. In some embodiments, the acoustic sensor 204 may be attached to an exterior surface of the valve 202. For example, the acoustic sensor 204 may be mechanically affixed to an exterior surface of a housing of the valve 202 by a bolt, an adhesive, a magnet, or other suitable attachment method. In some embodiments, the acoustic sensor 204 may be disposed within the valve 202. For example, the acoustic sensor 204 may be built into the housing of the valve 202.

Figure 3:
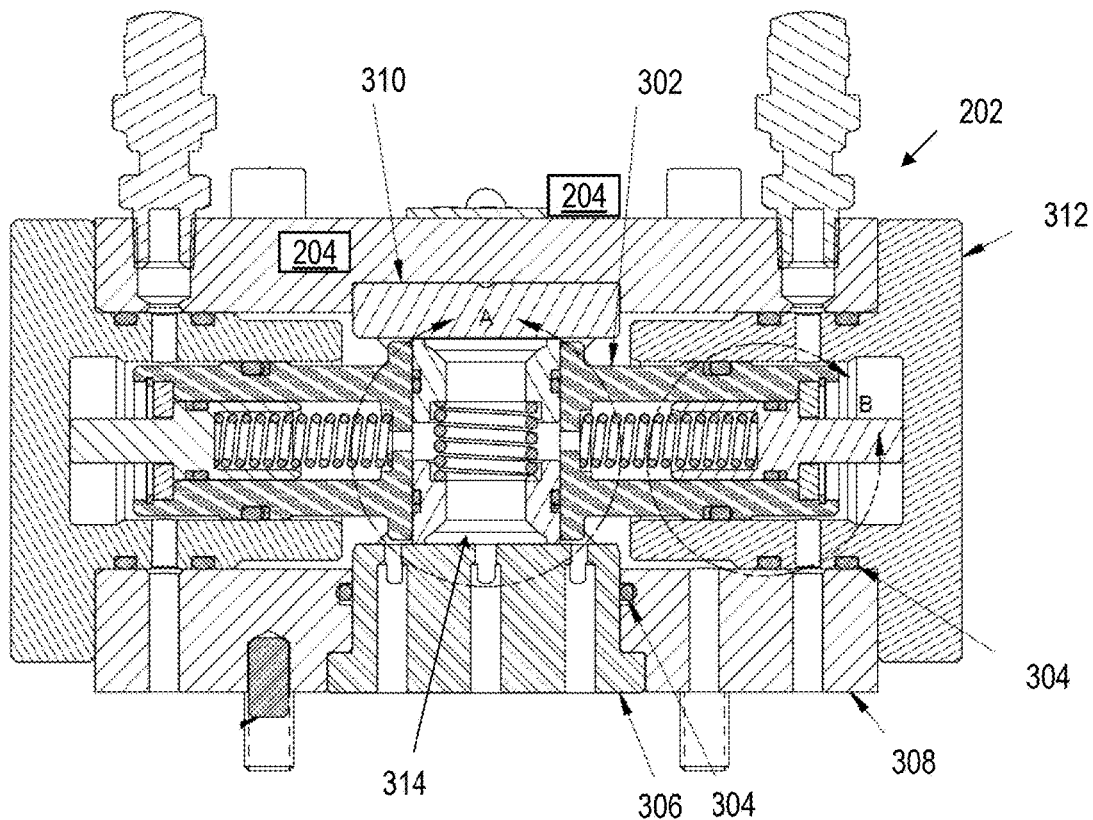
FIG. 3 shows a cross-section of a valve with associated acoustic sensor in accordance with various embodiments.

Embodiments of the valve 202 may be constructed of various materials. For example, the sealing components and surfaces of the valve 202 may be metal, plastic, and/or elastomeric. FIG. 3 shows a cross-section of an example of a valve 202 with associated acoustic sensor 204 in accordance with various embodiments. The valve 202 includes a piston 302, an inlet/outlet seal plate 306, a number of elastomeric seals 304, a blind seal plate 310, seal rings 314, a valve body 308, end caps 312, springs, and various other components. As explained above, the acoustic sensor 204 may be attached to an outer surface of the valve body 308 or internally incorporated in the valve body 308 or other component of the valve 202. Both configurations are shown in FIG. 3. The valve monitoring system 200 can identify leaks in metal-to-metal seals (e.g., between inlet/outlet seal plate 306 and seal ring 314), elastomeric seals, and other seals of the valve 202.

The acoustic sensor 202 may be any of a variety of types of transducers that convert vibration into electrical signals. The acoustic sensor 202 may include an accelerometer (e.g., a micro-electro-mechanical system (MEMS) accelerometer), a piezoelectric element, optical fibers, or other transduction element suitable for detecting vibration of the valve 202.

Returning now to FIG. 2, signals generated by the acoustic sensor 204 (e.g., electrical signals representative of the vibration of the valve 202 detected by the acoustic sensor 204) are provided to the valve monitor 206. The valve monitor 206 processes the signals received from the acoustic sensor 204 to characterize operation of the acoustic sensor 204. The valve monitor 206 can identify a variety of operational conditions of the valve 202 based on the signals received from the acoustic sensor 204. In some embodiments, the valve monitor 206 can identify when the valve 202 is opening or closing based on the acoustic signals generated by the valve 202 while opening or closing. As a result, the valve monitor 206 can measure the time required to open the valve 202 and the time required to close the valve 202. An increase in the time needed to open or close the valve 202 may indicate degradation in operation of the valve 202. Significant change in the operation time of the valve 202 may, for example, trigger maintenance operations to replace the valve 202 prior to failure. Similarly, based on the acoustic signals generated by the valve 202 and detected by the acoustic sensor 204, the valve monitor 206 may be able to detect whether the valve 202 is open or closed. Accordingly, the valve monitor 206 can indicate that valve 202 is in an incorrect state which may trigger action to correct the state of the valve 202.

Using the acoustic signals generated by the valve 202 while opening or closing, the valve monitor 206 can identify static friction (stiction) in valve 202. Generally, stiction is friction between stationary components of the valve 202 that inhibits relative motion between the components when the valve 202 is actuated. For example, stiction between sealing surfaces may inhibit opening or closing of the valve 202. The valve monitor 206 may identify stiction in the valve 202 as delay from a point in time that valve actuation is initiated until the internal components of the valve 202 move. The valve monitor 206 can measure such actuation delay by monitoring operation of a solenoid valve of the pod 100, or other control signal (via a valve control system) indicating that the valve 202 is being actuated, and monitoring the acoustic signature of the valve 202. If the time delay between initiation of valve actuation and initial movement of the valve (as identified via the acoustic signals generated by movement within the valve 202) changes over time (most likely to increase) the change in time delay may be indicative of stiction in the valve 202. The valve monitor 206 may report detected stiction to an authority responsible for operation of the valve 202 to allow scheduling of maintenance.

Figure 4:
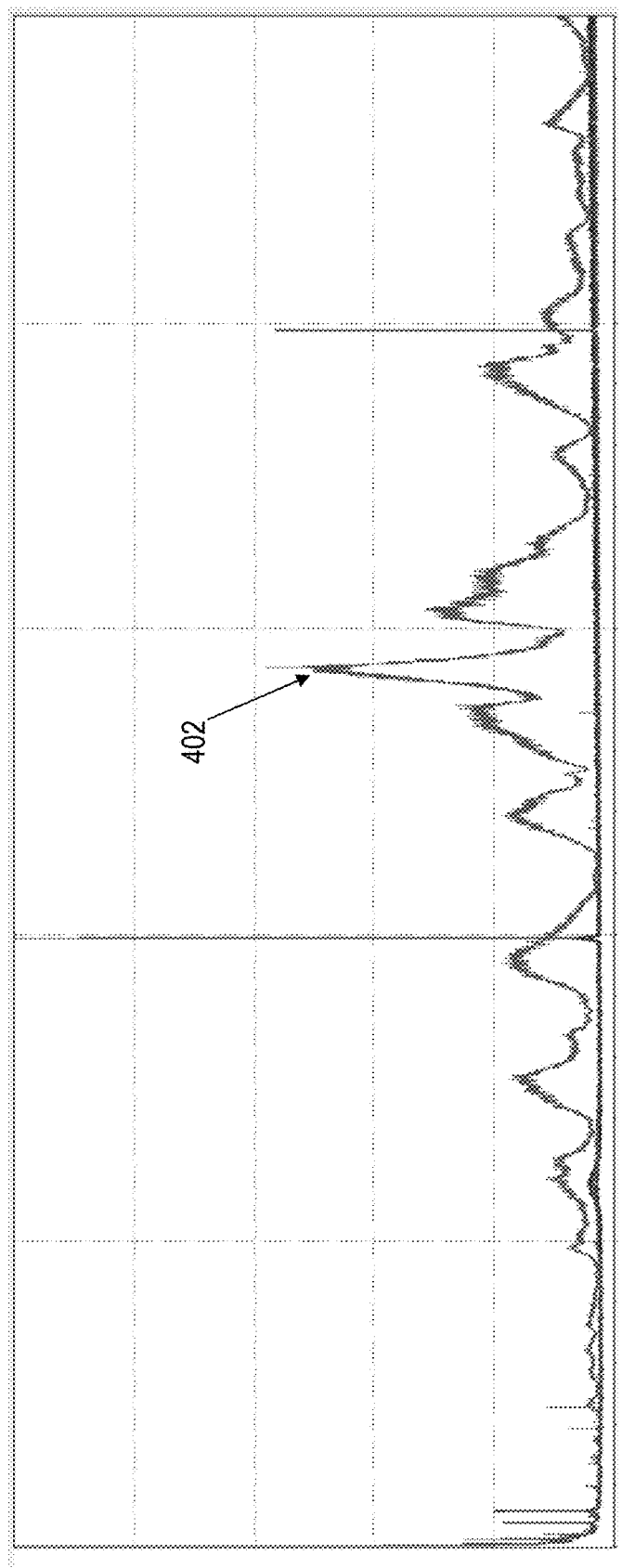
FIG. 4 shows an example of an acoustic energy plot generated by a leaking valve in accordance with various embodiments.

The valve monitor 206 may also detect leaks in the valve 202 based on the acoustic signals generated by the valve 202 and detected by the acoustic sensor 204. In some embodiments of the valve 202, a leak in the valve 202 may be indicated by acoustic signals generated at a particular frequency. FIG. 4 shows a plot of acoustic signal energy generated by the valve 202. To produce the plot of FIG. 4, the valve monitor 206 applies a frequency transform (e.g., a fast Fourier transform) to the signals received from the acoustic sensor 204 to generate a frequency domain representation of the signals. The increase in energy at point 402 indicates that the valve 202 is leaking. Accordingly, the valve monitor 206 may identify a particular frequency band that is indicative of a leak in the valve, and identify the valve as leaking if acoustic energy in the particular frequency band rises above a predetermined level or increased by a predetermined amount (e.g., while the valve 202 is closed).

Some embodiments of the valve monitor 206 may acquire a baseline model of steady-state acoustic data generated by the valve 202 and compare the baseline model to acoustic data generated by the valve 202. Changes in the steady-state acoustic energy generated by the valve 202 may indicate that a leak or other undesirable condition has arisen in the valve 202. If the valve monitor 206 determines, based on the signals received from the acoustic sensor 204, that the valve 202 has degraded, developed a leak, or otherwise undergone a change in operational performance, then the valve monitor 206 may provide an alert indicative of the change in condition of the valve 202. In response to the alert, maintenance or replacement of the valve 202 may be scheduled.

Figure 5:
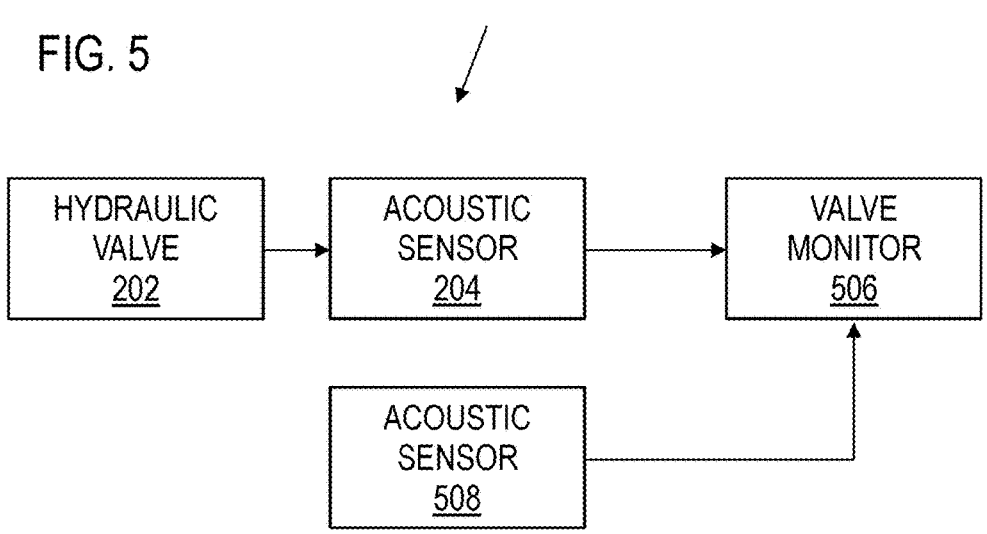
FIG. 5 shows a block diagram of a valve monitoring system in accordance with various embodiments.

FIG. 5 shows a block diagram of a valve monitoring system 500 suitable for use in the drilling system 150. The valve monitoring system 500 is similar to the system 200 described above, but includes an additional acoustic sensor 508. As in the system 200, the acoustic sensor 204 is coupled to the valve 202 for detection of acoustic signals generated by the valve 202. Unlike, the acoustic sensor 204, the acoustic sensor 508 is not coupled to the valve 202 for detection of acoustic signals generated by the valve 202. Rather, the acoustic sensor 508 is positioned to detect acoustic signals present in the environment in which the valve 202 operates. In the BOP 156 and the riser 154 a variety of noise sources generate acoustic signals. For example, motion of a drill string passing through the BOP 156 and the riser 154 generates acoustic noise. Similarly, actuation of solenoids, valves and other devices in the BOP 156 generate acoustic noise. The acoustic sensor 508 detects the ambient acoustical noise proximate the hydraulic valve 202, generates electrical signals representative of the ambient acoustical noise, and provides the signals to the valve monitor 506. The valve monitor 506 applies the ambient noise signal received from the acoustic sensor 508 to filter ambient noise from the valve acoustic signals received from the acoustic sensor 204. For example, the valve monitor 506 may subtract the ambient noise signal, or a portion thereof, from the valve acoustic signals.

Some embodiments of the valve monitor 506 may filter ambient noise from the acoustic signals received from the acoustic sensor 204 by applying a low cut filter to the valve acoustic signals, in lieu of, or in addition to use of ambient noise signals as described above. For example, if ambient noise is generally at frequencies below 100 Hz, then the valve monitor 506 may apply a low-cut filter having a 100 Hz corner frequency (or other suitable corner frequency) to acoustic signals received from the acoustic sensor 204 to remove the ambient acoustic noise.

In some embodiments, the valve monitor 506 may reduce the level of ambient noise in the valve acoustic signals using the acoustic signals provided by a plurality of the acoustic sensors 204. For example, the valve monitor 506 may sum the acoustic signals provided by a plurality of the acoustic sensors 204 over a given time interval to generate a composite acoustic signal in which ambient noise is reinforced and valve specific acoustic signal is attenuated. Subtraction of the composite acoustic signal from the acoustic signal provided by each of the plurality of the acoustic sensors 204 may attenuate the ambient noise present in each of the resultant valve acoustic signals.

Figure 6:
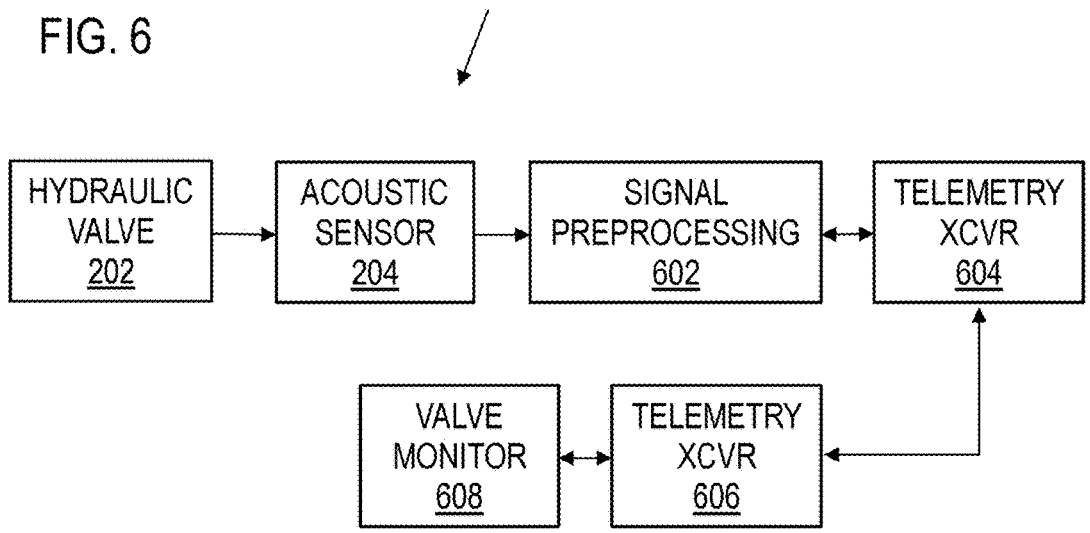
FIG. 6 shows a block diagram of a valve monitoring system in accordance with various embodiments.

In some embodiments, at least a portion of the signal processing or preconditioning applied to the acoustic sensor output signals, and associated with the valve monitor 506 in some embodiments, may be performed proximate the acoustic sensor 204. FIG. 6 shows a block diagram of a valve monitoring system 600 that provides preprocessing proximate the acoustic sensor 204 in accordance with various embodiments. In the valve monitoring system 600, the acoustic sensor 204 is disposed proximate the valve 202 as explained with regard to the system 200, and the valve monitor 608 is disposed at the surface (e.g., on the rig 152). The signal preprocessing circuitry 602 and telemetry transceiver 604 are disposed proximate the acoustic sensor 204, and the telemetry transceiver 606 is disposed proximate the valve monitor 608. The telemetry transceivers 604 and 606 may employ any of a variety of data communication protocols. For example, the telemetry transceivers 604 and 606 may employ Ethernet or Controller Area Network protocols to communicate via cabling that connects the transceivers 604 and 606.

The signal preprocessing circuitry 602 receives the signals generated by the acoustic sensor 204 and can apply various preprocessing operations. For example, the signal preprocessing circuitry 602 may include an analog-to-digital converter to digitize the signals, an anti-alias filter, a low-cut filter to reduce ambient noise content, etc. The various operations performed by the signal preprocessing circuitry 602 may be implemented using analog or digital techniques and components in different embodiments.

The preprocessed signal generated by the signal preprocessing circuitry 602 is provided to the telemetry transceiver 604. The telemetry transceiver 604 transmits the preprocessed signal to the telemetry transceiver 606. The telemetry transceiver 606 receives the signal transmitted by the telemetry transceiver 604 and provides the received signal to the valve monitor 608 for further processing and use in characterization of the valve 202 as described herein.

The preprocessing circuitry 602 may also be configurable via information received from the valve monitor 608 via the telemetry transceiver 604. In some embodiments, the signal preprocessing circuitry 602 may include field programmable components, such as a field programmable gate array or a digital signal processor, which can be configured by the valve monitor 608 to change the functionality provided by the signal preprocessing circuitry 602. For example, the valve monitor 608 may change the corner frequency of a filter applied by the signal processing circuitry 602, or other operational parameters, using a command transmitted via the telemetry transceiver 604.

Figure 7:
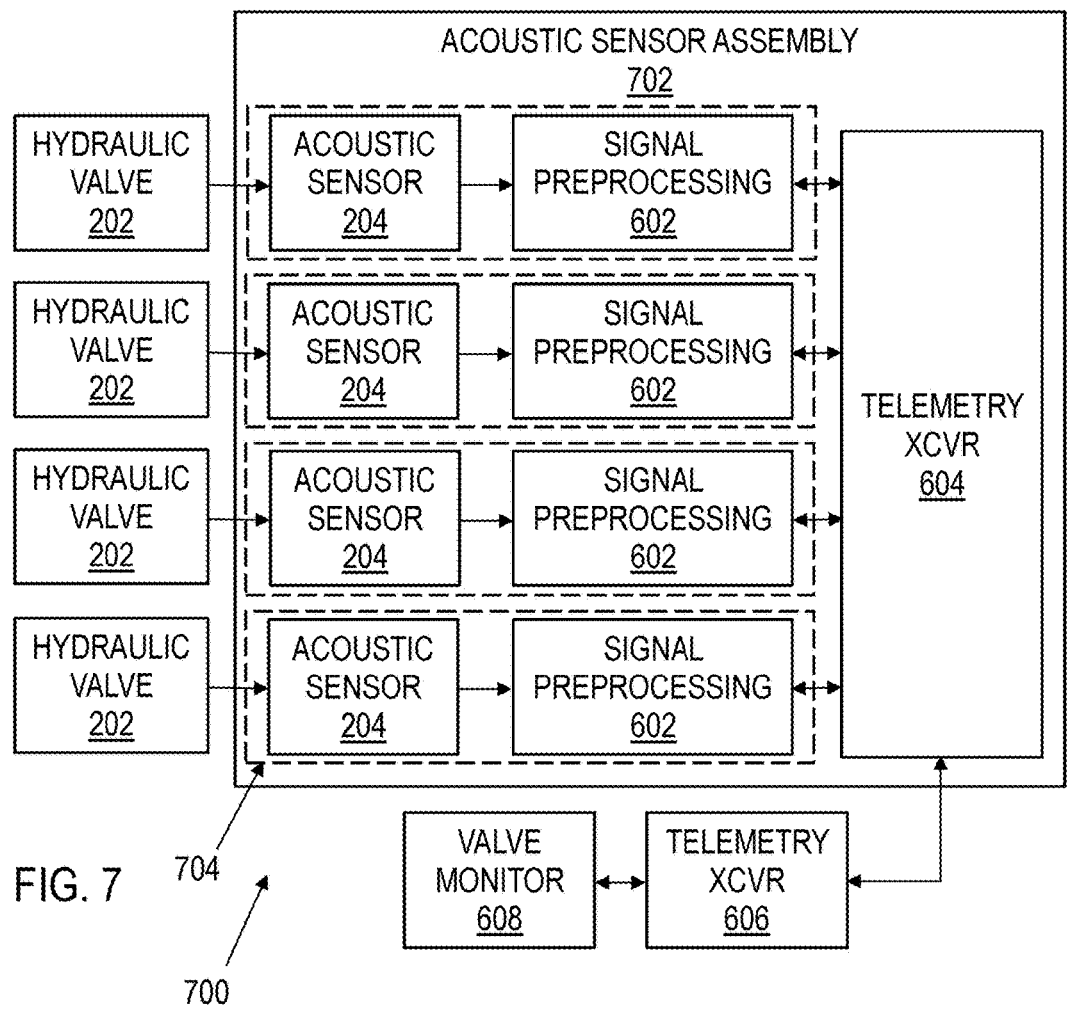
FIG. 7 shows a block diagram of an acoustic sensor assembly that includes a plurality of acoustic sensing channels in accordance with various embodiments.

In some embodiments of the control pod 100, a number of valves 202 may be located in close proximity to one another. To facilitate monitoring of a number of proximate valves 202, some embodiments of the valve monitoring system disclosed herein may group a number of acoustic sensors 204 and associated signal preprocessing circuits 602 in an assembly that communicates with the valve monitor 608 via a single transceiver 604 that is coupled to all of the signal preprocessing circuits 602. FIG. 7 shows a block diagram for a system 700 that includes an acoustic sensor assembly 702. The acoustic sensor assembly 702 includes a plurality of acoustic sensing channels 704 and a telemetry transceiver 604. Each acoustic sensing channel 704 includes an acoustic sensor 204 and associated signal preprocessing circuit 602. The telemetry transceiver 604 manages communication with the valve monitor 608 for all of the acoustic sensing channels included in the assembly 702. Accordingly, acoustic signal outputs of each of the signal preprocessing circuits 602 are provided to the telemetry transceiver 604 for transmission to the valve monitor 608. Each of the acoustic sensing channels 704 may be addressable to allow the valve monitor 608 to individually communicate with and control each of the channels 704.

In some embodiments of the acoustic sensor assembly 702, the preprocessing circuitry 602 for multiple acoustic sensing channels 704 may be aggregated in a single device, or a single instance of the preprocessing circuitry 602 may perform preprocessing functions for a plurality of acoustic sensors 204. Though the acoustic sensor assembly 702 is illustrated as including four acoustic sensing channels 704 as a matter of convenience, in practice the acoustic sensor assembly 702 may include any number of acoustic sensing channels 704

Figure 8:
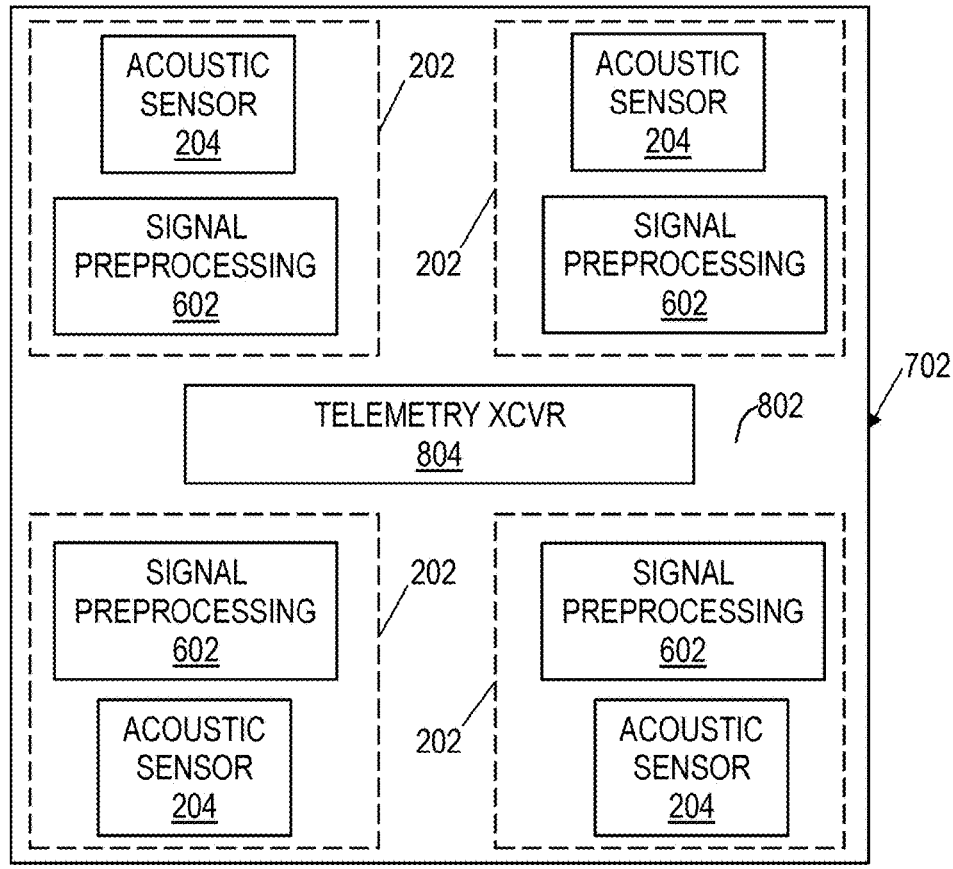
FIG. 8 shows a diagram of an acoustic sensor assembly that includes a plurality of acoustic sensing channels in accordance with various embodiments.

FIG. 8 shows another diagram of the acoustic sensor assembly 702. In FIG. 8, the acoustic sensors 204, signal preprocessing circuitry 602, and telemetry transceiver 804 are attached to a common substrate 802. The substrate 802 may be a metal plate or housing, or may be a platform of another suitable material. The acoustic sensors 204 are arranged on the substrate 802 such that each of the sensors 204 corresponds to, and is brought into contact with, one of the valves 202 of the control pod 100 when the acoustic sensor assembly is attached to the control pod 100. Accordingly, by attaching the substrate 802 to the control pod 100, a plurality of valves 202 may be monitored. In some embodiments, a material that provides acoustic insulation may be disposed between the substrate 802 and each acoustic sensor 204 to reduce cross talk between the sensors 204.

Figure 9:
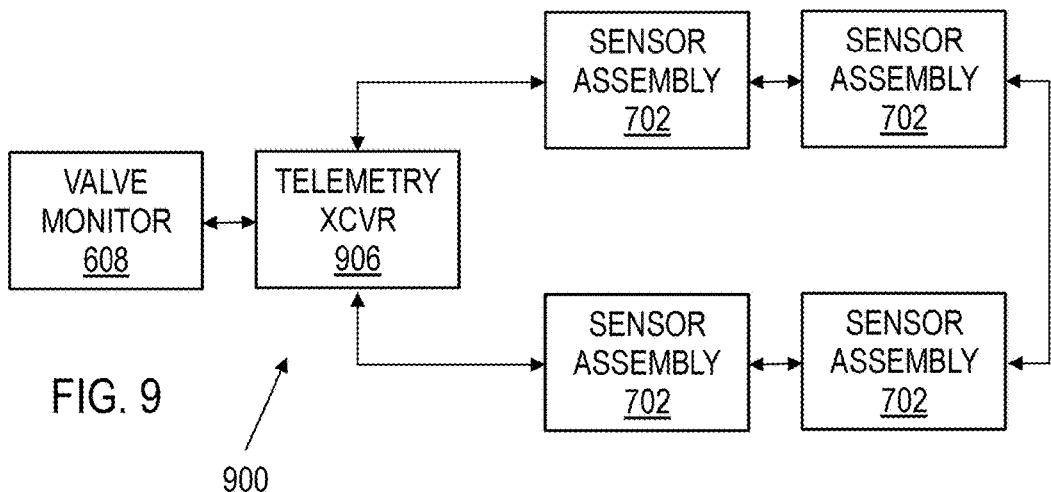
FIG. 9 shows a block diagram of a valve monitoring system in accordance with various embodiments.

FIG. 9 shows a block diagram of a valve monitoring system 900. The valve monitoring system 900 includes a plurality of acoustic sensor assemblies 702. The acoustic sensor assemblies 702 are arranged, in conjunction with the telemetry transceiver 906 coupled to the valve monitor 608, to form a ring topology. The ring topology advantageously provides redundant communication paths to each of the sensor assemblies 702, thereby enhancing the reliability of communication with sensor assemblies 702 in the relatively harsh environments to which the sensors assemblies are subject when used to monitor the valves 202.

FIG. 10 shows a block diagram of a valve monitor 1000 in accordance with various embodiments. The valve monitors 206, 506, and 608 disclosed herein may be implemented as the valve monitor 1000. The valve monitor 1000 includes a processor 1002 and storage 1004. The valve monitor 1000 may also include various other components that have been omitted from FIG. 10 in the interest of clarity. For example, embodiments of the valve monitor 1000 may include a display device, such as a computer monitor, user input devices, network adapters, etc. Some embodiments of the valve monitor 1000 may be implemented as a computer, such as a desktop computer, a laptop computer, a server computer, a mainframe computer, or other suitable computing device.

The processor 1002 may include, for example, a general-purpose microprocessor, a digital signal processor, a microcontroller or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 1004 is a non-transitory computer-readable storage medium suitable for storing instructions executed by the processor 1002 and data processed by the processor 1002. The storage 1004 may include volatile storage such as random access memory, non-volatile storage (e.g., a hard drive, an optical storage device (e.g., CD or DVD), FLASH storage, read-only-memory), or combinations thereof.

The storage 1004 includes valve characterization module 1006, valve acoustic signal processing module 1008, valve acoustic signals 1010, and valve baseline acoustic signals 1012. The valve baseline acoustic signals 1012 include initialization signals and/or parameters of initialization signals acquired from each valve 202 at a point in time when the valve 202 is operating at an optimal level. For example, the valve baseline acoustic signals 1012 may include valve acoustic signals acquired when the valve 202 is initially put into service, or standardized signals representative of operation of a fully functional valve 202. The valve acoustic signals 1010 include signals detected by the acoustic sensors 204 coupled to each valve 202. The valve acoustic signals 1010 may be processed via execution of the valve acoustic signal processing 1008, and the results analyzed via execution of the valve characterization 1006 to determine the condition of each valve 202.

The valve acoustic signal processing 1008 includes instructions executed by the processor 1002 to prepare the valve acoustic signals for analysis. For example, the valve acoustic signal processing 1008 may include instructions to reduce the amplitude of ambient noise present in the valve acoustic signals, to transform the time-domain valve acoustic signals into frequency-domain representations, to filter unwanted frequency content from the valve acoustic signals, and to provide other signal processing functionality disclosed herein.

The valve characterization 1006 includes instructions executed by the processor 1002 to characterize and evaluate the condition of each valve 202. For example, the valve characterization 1006 may include instructions to compare valve acoustic signals processed via the valve acoustic signal processing 1008 to the valve baseline acoustic signals 1012, or to determine whether the valve acoustic signals processed via the valve acoustic signal processing 1008 exhibit a trend of change indicative of valve performance degradation. In some embodiments, the valve characterization 1006 may include instructions that identify a leak in a valve 202 by identifying an increase in amplitude within a particular frequency band determined to indicate a leak. The valve characterization 1006 may also include instructions that measure the time duration of acoustic signal generated by opening or closing the valve 202 and determine whether the duration is increasing over time as an indication of performance degradation. The valve characterization 1006 may further include instructions that determine whether the valve is open or closed based on the valve acoustic signals processed via the valve acoustic signal processing 1008. Instructions of valve characterization 1006 may cause the processor 1002 to issue an alert indicating that the valve 202 may require attention if a leak or other performance anomaly is detected. The alert may be presented on a display device or otherwise provided to an authority responsible for maintaining the integrity of the valves 202.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for monitoring valve operation, comprising: a first acoustic sensor to couple to a valve to detect vibration of the valve;
    a second acoustic sensor to detect ambient vibration proximate the valve;
    a monitoring system communicatively coupled to the first acoustic sensor and to the second acoustic sensor, the monitoring system configured to:
        receive a signal generated by the first acoustic sensor, the signal representative of vibration of the valve;
        receive a signal generated by the second acoustic sensor, the signal representative of ambient vibration;
        filter the ambient vibration from the signal generated by the first acoustic sensor based on the signal generated by the second acoustic sensor; and
        identify a band of frequencies in the signal indicative of leakage; and
        identify leakage in the valve based on the signal.

2. The apparatus of claim 1, wherein the monitoring system is configured to identify the leakage based on amplitude of the signal in the band.

3. The apparatus of claim 1, wherein the monitoring system is configured to:
    identify opening or closing of the valve based on the signal.

4. The apparatus of claim 3, wherein the monitoring system is configured to measure time during which movement in the valve is associated with the opening or closing of the valve.

5. The apparatus of claim 4, wherein the monitoring system is configured to identify degradation of the valve based on time for the opening or closing of the valve increasing.

6. The apparatus of claim 1, wherein the first acoustic sensor comprises an accelerometer or a piezoelectric transducer.

7. The apparatus of claim 1, wherein the monitoring system is configured to compare the signal generated by the first acoustic sensor to a signal indicative of vibration in the valve while the valve is not leaking to identify the leakage.

8. The apparatus of claim 1, wherein the monitoring system is configured to:
    identify movement in the valve based on the signal; and
    identify static friction in the valve by measuring a time difference between initiation of actuation of the valve and the movement in the valve.

9. A well control system, comprising:
    a blowout preventer;
    a hydraulics module comprising:
        a first valve configured to provide hydraulic pressure to the blow out preventer;
        a first acoustic sensor coupled to the first valve to detect vibration of the first valve;
        a second acoustic sensor to detect ambient vibration; and
    a monitoring system communicatively coupled to the first acoustic sensor and the second acoustic sensor, the monitoring system configured to:
        receive a first signal generated by the first acoustic sensor, the first signal representative of vibration of the first valve;
        receive a second signal generated by the second acoustic sensor, the second signal representative of ambient vibration;
        filter the ambient vibration from the first signal generated by the first acoustic sensor based on the second signal generated by the second acoustic sensor; and
        identify a condition of the first valve based on the first signal.

10. The well control system of claim 9, wherein the condition comprises at least one of fluid leakage in the first valve and operation of the first valve.

11. The well control system of claim 9, wherein the monitoring system is configured to identify a band of frequencies in the signal indicative of fluid leakage in the first valve, and identify fluid leakage in the first valve based on amplitude of the signal in the band.

12. The well control system of claim 10, wherein the operation of the first valve comprises opening or closing of the first valve.

13. The well control system of claim 10, wherein the monitoring system is configured to measure time during which movement in the valve is associated with the opening or closing of the valve.

14. The well control system of claim 13, wherein the monitoring system is configured to identify wear of the first valve based on an increase or decrease in time for the opening or closing of the first valve.

15. The well control system of claim 9, wherein the hydraulic module comprises:
    a plurality of valves configured to provide hydraulic pressure to the blow out preventer;
    and a plurality of acoustic sensors, each of the acoustic sensors coupled to one of the valves to detect vibration in one of the valves; and
    wherein the monitoring system is communicatively coupled to the acoustic sensors, and the monitoring system is configured to:
        receive signals generated by the acoustic sensors, the signals representative of vibration of the valves; and;
        identify a condition of each of the valves based on the signals.

16. The well control system of claim 15, wherein the monitoring system is configured to compare each of the signals generated by the acoustic sensors to a signal indicative of vibration in the valves while the valves are not leaking to identify leakage in each of the valves.

17. The well control system of claim 9, wherein the monitoring system is configured to:
    identify movement in the first valve based on the first signal; and identify static friction in the first valve by measuring a time difference between initiation of actuation of the first valve and the movement in the first valve.

18. A fluid control assembly,
comprising: a first valve to control flow of fluid;
a second valve to control flow of fluid;
a first acoustic sensor coupled to the first valve to detect vibration of the first valve; a second acoustic sensor coupled to the second valve to detect vibration of the second valve;
a third acoustic sensor to detect ambient vibration; and
a monitoring system communicatively coupled to the first acoustic sensor, the second acoustic sensor, and the third acoustic sensor, the monitoring system configured to:
receive signals generated by the first acoustic sensor and the second acoustic sensor that are representative of vibration of the first valve and the second valve;
receive a signal generated by the third acoustic sensor that is representative of ambient vibration;
identify a condition of each of the first valve and the second valve based on the signals received from the first acoustic sensor, the second acoustic sensor, and the third acoustic sensor.

19. The fluid control assembly of claim 18, the condition comprises at least one of fluid leakage in and operation of the first valve and at least one of fluid leakage in and operation of the second valve.

20. The fluid control assembly of claim 19, wherein the monitoring system is configured to identify a band of frequencies in the signal generated by the first acoustic sensor that is indicative of fluid leakage in the first valve, and identify fluid leakage in the first valve based on amplitude of the signal in the band.

21. The fluid control assembly of claim 19, wherein the monitoring system is configured to:
measure time during which movement in each of the first valve and the second valve is associated with the opening or closing; and
identify degradation of the each of the first valve and the second valve based on time for the opening or closing increasing or decreasing.

22. The fluid control assembly of claim 19, wherein the monitoring system is configured to:
identify movement in the first valve based on the signals generated by the first acoustic sensor; and
identify static friction in the first valve by measuring a time difference between initiation of actuation of the first valve and the movement in the first valve.

* * * * *